Oct. 5, 1954
R. D. SEVICK
2,690,632
ABRASIVE CUTTING WHEEL
Filed Sept. 25, 1953
2 Sheets-Sheet 1
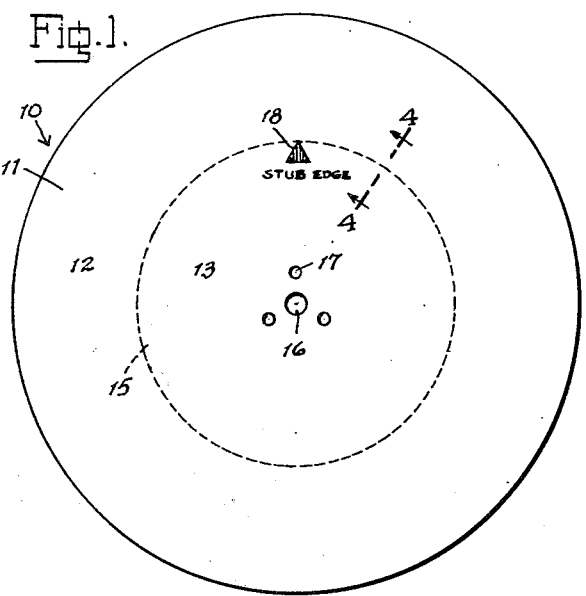
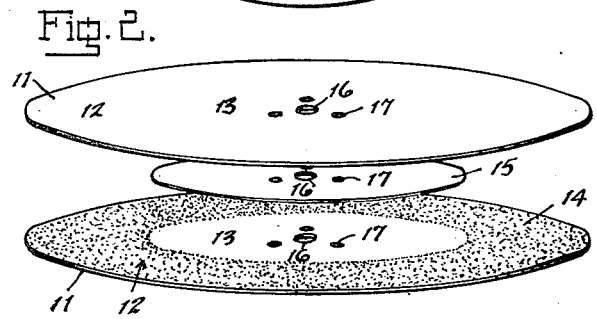
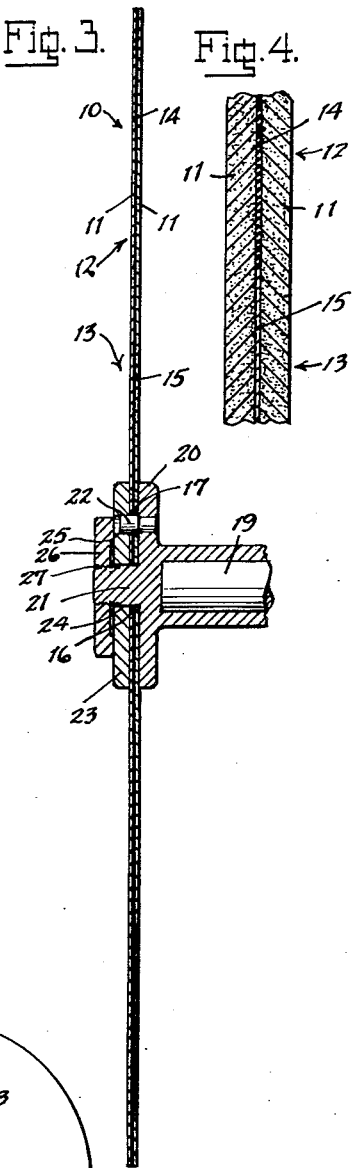
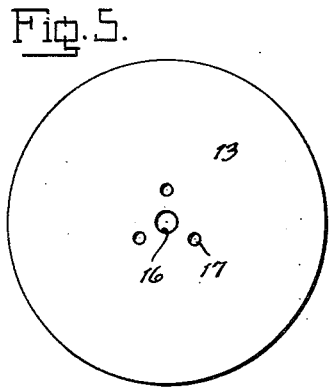
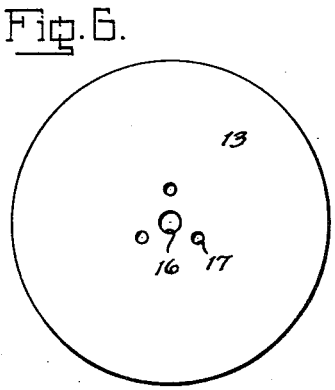
INVENTOR
RICHARD D. SEVICK
BY
ATTORNEY

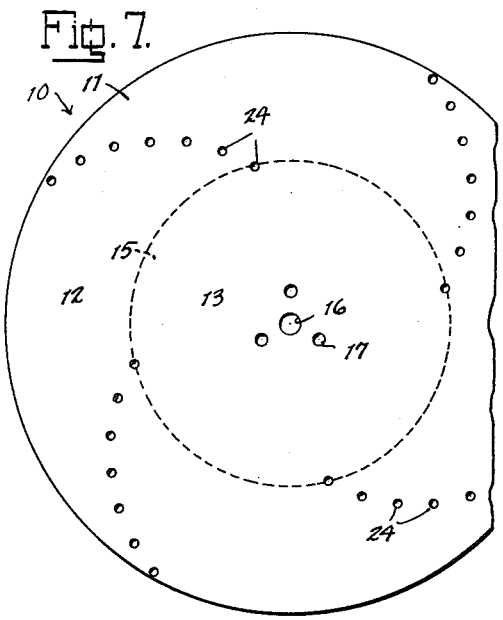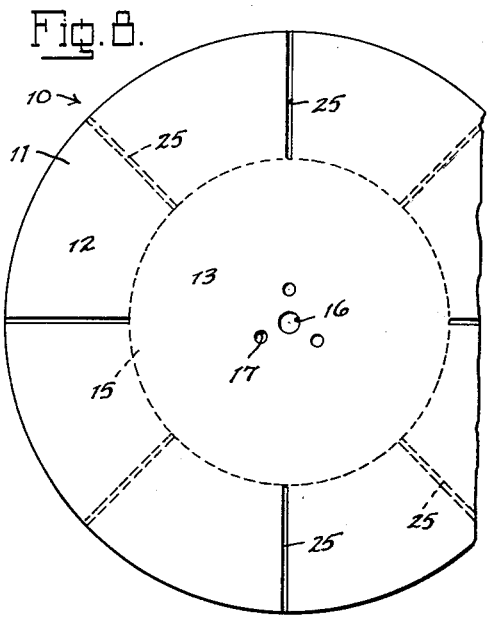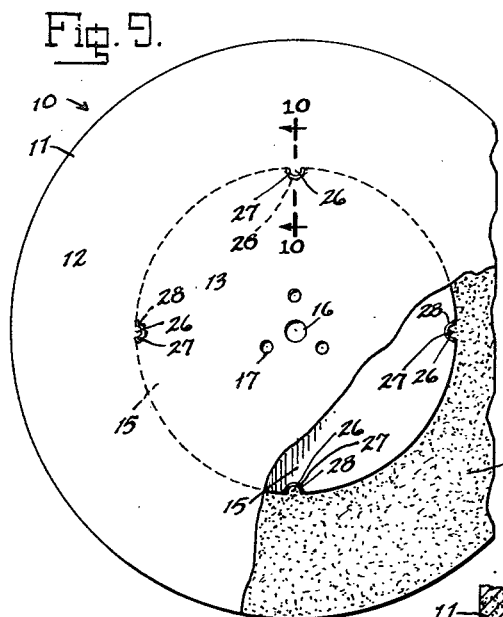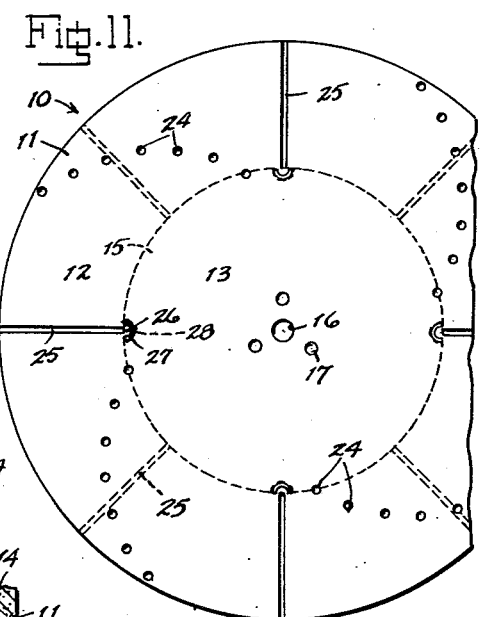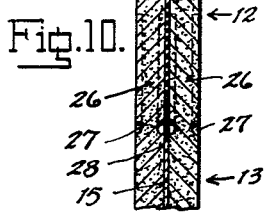

Patented Oct. 5, 1954

2,690,632

UNITED STATES PATENT OFFICE 2,690,632

ABRASIVE CUTTING WHEEL

Richard D. Sevick, Long Hill, Conn., assignor to The Allison Company, Bridgeport, Conn., a corporation of Connecticut Application September 25, 1953, Serial No. 382,424

10 Claims. (Cl. 51—207)

The present invention relates to an improvement in abrasive cutting wheels of the type employed for cutting alloy steel and other tough metals. Cutting wheels are characterized by their relatively small thickness and relatively large diameter, and are to be distinguished from grinding or other types of abrasive wheels in that their use is limited to such operations as cutting, cutting-off, grooving, slotting, coping, jointing, etc., and it is the purpose of such wheels in general, and of the present invention in particular, to provide a wheel of minimum thickness and maximum diameter while still maintaining adequate stability against breakage, fracture, etc., resulting from the extremely high speed at which such wheels are operated and the forces developed through centrifugal force and resistance of the material being cut. In the American Standard Safety Code relating to abrasive wheels, issued by American Standards Association, cutting wheels are defined as having a thickness not more than 1/48 of their diameter for wheels up to 20" in diameter, and not more than 1/60 of the diameter of those larger than 20" in diameter.

An object is to provide a laminated abrasive cutting wheel in which the central area or stub of the wheel may be utilized after the rim portion has been reduced by wear beyond the optimum size for cutting large diameter material, the laminations constituting such central area being separable so that each lamination constitutes a separate cutting wheel of smaller diameter and less thickness than the original wheel. To this end it is proposed to provide a laminated abrasive cutting wheel in which the rim portion, representing the optimum area of the wheel suitable for cutting large diameter material, has the laminations bonded together, for example, by suitable adhesive or by pressure alone, while in the central area the laminations are unbonded, so that when the wheel rim is worn down to the inner periphery of the bonded area the laminations of the central area are free to be separated so that each lamination provides a separate cutting wheel.

A further object is to provide in the central area separator means between the laminations to prevent adherance of such laminations, such means being for example, sheet, liquid or powder material.

A further object is to provide indicating means which will visually indicate the point at which the bonded rim portion terminates.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a front elevation showing the cutting wheel according to the invention;

Fig. 2 is a perspective view showing the laminations in separated relation, and showing a separator disc between the laminations;

Fig. 3 is a vertical sectional view on an enlarged scale showing the cutting wheel attached to the flanges of a driving spindle, also shown in vertical section;

Fig. 4 is a fragmentary sectional view on a greatly enlarged scale, taken along the line 4—4 of Fig. 1;

Figs. 5 and 6 are side elevational views showing the two cutting wheels produced from the central area of the wheel as shown in Fig. 1 following the wearing down of the rim portion;

Fig. 7 is a side elevational view, partially broken away, showing a modified form of the invention in which water holes are provided in the rim portion;

Fig. 8 is a side elevational view, partially broken away, showing another modified wheel in which radial water slots are provided in the rim portion;

Fig. 9 is a side elevational view, partially broken away, showing a further modified form of wheel in which the central area is provided at its periphery with a series of adhered break-out portions;

Fig. 10 is a fragmentary sectional view on a greatly enlarged scale, taken along the line 10—10 of Fig. 9; and Fig. 11 is a side elevational view, partially broken away, of a further modified form of wheel provided with water holes as shown in Fig. 7, radial slots as shown in Fig. 8, and break-out portions as shown in Fig. 9.

Referring to the drawings, and more particularly to Figs. 1–6, the improved laminated abrasive cutting wheel, according to the illustrated exemplary embodiment of the invention shown therein, consists of a thin circular disc-shaped body indicated generally as 10 and comprising a pair of circular disc-shaped laminations 11—11 which are bonded together at their rim portions, as will presently more fully appear. These discs are molded or otherwise suitably formed of the usual abrasive materials, such as abrasive grain and a suitable bond such as resin, rubber or the like, the material being subject during its formation to the usual curing procedures.

According to the invention, the wheel comprises an annular rim portion indicated generally in Fig. 1 as 12, and a central circular stub portion indicated generally as 13, the rim portion being of a width calculated as the optimum part of the wheel for cutting large diameter material, and the stub portion being of a diameter calculated as providing a cutting wheel by itself for cutting smaller diameter material. While the diameter of the wheel may range between the minimum and maximum diameters for cutting wheels, for example, between 16" and 60", the illustrated wheel may be considered a typical example of the invention in which the outside diameter of the rim portion is 36" and the diameter of the stub portion is 20", so that the radial width of the rim portion is 8". The approximate thickness of the wheel is ¼", the laminations 11—11 each being approximately ⅛".

According to the invention the laminations are bonded together at the rim portion by suitable bonding means. Such bonding means may consist, for example, in applying suitable high pressure to the laminations so that they bond together by pressure alone, or it may consist in a suitable adhesive material 14 as, for instance, phenolic glue, liquid rubber, resins or the like, applied in the form of a ring to the inner surfaces of the laminations, as shown clearly in Fig. 2, the circular space within this ring having a suitable separator means placed therein. Such separation means may consist, for example, of a circular separator sheet formed of cellophane, waxed paper, or other suitable material adapted to prevent adherence of the laminations at the central stub portion 13 of the wheel, or it may consist of a liquid, for instance, silicone, or a powder, for instance, soapstone. The laminated wheel structure, when bonded together by the adhesive 14, or by pressure alone, is suitably cured so that the structure of the rim portion 12 is, in effect, a homogeneous mass of abrasive material.

The body of abrasive material making up the wheel extends in close proximity to the center of the wheel, being provided with a spindle receiving center hole 16 and in outwardly spaced relation to the center hole with a plurality of driving holes 17. These holes are preferably produced in the two laminations 11—11 and in the separator 15 prior to the bonding together of the laminations, but may be produced in the wheel after bonding, if desired. An indicating marker 18, indicating the edge of the stub or central area 13, is stamped, printed or otherwise suitably inscribed in the wheel so as to visually indicate the point at which the rim portion 12 becomes completely worn away.

As shown in Fig. 3, the wheel is adapted to be mounted upon a driving spindle 19 having a hub flange 20 secured thereon which carries a center stud 21 engaged through the center hole 16 of the wheel, the flange also having a series of driving studs 22 engaged through the driving holes 17 of the wheel. A flange plate 23 having a center hole 24 and driving stud receiving holes 25 is engaged at the opposed side of the wheel from the flange 20 and is clamped to secure the wheel by a lock ring 26 screwed upon a threaded extension 27 of the hub 21 and bearing upon the forward face of the flange plate 23.

In operation the wheel is driven at relatively high speed in the cutting of relatively large diameter material, such as steel bars and the like, and during the cutting operation the rim portion gradually wears down. The optimum point to which the wheel may be reduced by wear by cutting large diameter material is represented by the inner periphery of the bonded rim portion 12, and the reaching of this point is indicated when the wheel wears to the indicator mark 18. Thereupon the two laminations 11—11 and the separator sheet 15 making up the center portion may be separated to provide the pair of cutting wheels, as shown in Figs. 5 and 6, these each being in the illustrated example approximately 20" in diameter and ⅛" thick. Each is adapted to be mounted on a spindle similar to that shown in Fig. 3 for performing cutting operations upon material suitable to this size of cutting wheel.

In Fig. 7 there is shown a modification in which the rim portion 12 of the wheel is provided with water holes 24, arranged in a pattern designed to produce a proportional reduction in weight toward the outer periphery and therefore reduce the effect of centrifugal force upon the rim portion of the wheel. The arrangement preferably consists in disposing a plurality of series of spaced holes along circumferentially spaced spiral lines extending from the outer periphery of the wheel to the inner periphery of the rim portion 12. Thus the inner hole of each series is in line with the division line between the rim portion 12 and the central stub portion 13, and constitutes an indicating means to indicate the point where the rim portion becomes completely worn away. These inner holes may therefore be considered as the functional equivalent of the indicating mark 18 provided upon the wheel as shown in Fig. 1.

In Fig. 8 there is shown another modified form of the invention in which the rim portion 12 is provided with a series of radial grooves 25 at each side. These grooves are formed by providing slot cuts in the rim portions of the separate laminations making up the wheel, and disposing the slots of one lamination in staggered relation to the slots of the other, so that the respective laminations provide bases for the slots in the other lamination. The grooves, in addition to forming water grooves for feeding water to the periphery of the wheel, also provide a series of clearance breaks in the periphery of the wheel, which provides a better cutting action, in that they prevent portions of the removed metal of the material being cut from collecting upon the periphery of the wheel and causing loading. The inner ends of the grooves are in line with the inner periphery of the rim portion 12 so that these ends constitute indicating means to indicate the point at which the rim portion becomes completely worn away. These inner ends are therefore the functional equivalent of the inner holes 24 as shown in Fig. 7 and the indicating means 18 as shown in Fig. 1.

In Figs. 9 and 10 there is shown another modification in which the central stub portion 13 of the wheel is provided at its periphery with a series of breakout sections 26 defined by semicircular weakening grooves 27 provided upon each side of both laminations. At these breakout points the two laminations are adhered together by the adhesive bonding the rim portion, the adhesive being extended into the breakout portions as clearly indicated in the broken away portion of Fig. 9. The separator sheet 15 is provided with a series of notches 28 conforming to the inner edges of the grooves 27. The outer ends of the semi-circular grooves 27 constitute indicating means to indicate the point at which the rim portion becomes completely worn away, and are therefore the functional equivalent of the indicating means provided by the inner ends of the grooves 25 in Fig. 8, the inner holes 24 in Fig. 7, and the indicating marker 18 in Fig. 1. When the rim portion is completely worn away, that is, to the point indicated by the outer ends of the grooves 27, the central stub portion 13 of the wheel remains adhered together at the spaced breakout points 26. In order to separate the two laminations to provide separate small diameter cutting wheels, the adhered portions at the breakout points 26 are broken away along the weakening lines provided by the grooves 27, whereupon the two laminations are separable from each other.

In Fig. 11 there is shown a further modification in which the wheel is provided with the holes 24, similar to those shown in Fig. 7, with the grooves 25, similar to those shown in Fig. 8, and the breakout points 26, defined by the semi-circular grooves 27 of the laminations 11—11, and the notches 28 of the separator sheet 15, similar to the breakout points 26 shown in Fig. 9.

What is claimed is:

1. An abrasive cutting wheel comprising a homogeneous rim portion and a central stub portion, said central stub portion comprising a plurality of separable layers integrally connected to the inner periphery of said rim portion whereby upon complete wearing down of said rim portion said layers of said central stub portion are separable to constitute individual cutting wheels.

2. The invention as defined in claim 1, further characterized by indicating means adapted to visually indicate the outer periphery of said central stub portion.

3. The invention as defined in claim 1, further characterized by a non-adhering separation means between said layers of said central stub portion.

4. The invention as defined in claim 1, further characterized by a plurality of series of water holes in said rim portion extending between its outer and inner peripheries, the innermost of said holes constituting indicating means indicating the outer periphery of said central stub portion.

5. The invention as defined in claim 1, further characterized by a plurality of radial water grooves in the side surfaces of said rim portion extending between its outer and inner peripheries, the inner ends of said grooves constituting indicating means indicating the outer periphery of said central stub portion.

6. The invention as defined in claim 1, further characterized by a plurality of circumferentially spaced breakout areas at the outer periphery of said central stub portion comprising adhered together areas of said layers.

7. The invention as defined in claim 1, further characterized by a plurality of circumferentially spaced breakout areas at the outer periphery of said central stub portion comprising adhered together areas of said layers, said areas being defined by weakening grooves constituting indicating means indicating the outer periphery of said central stub portion.

8. The invention as defined in claim 1, further characterized by a plurality of series of water holes in said rim portion extending between its outer and inner peripheries, the innermost of said holes constituting indicating means indicating the outer periphery of said central stub portion, a plurality of radial water grooves in the side surfaces of said rim portion extending between its outer and inner peripheries, the inner ends of said grooves constituting indicating means indicating the outer periphery of said central stub portion, and a plurality of circumferentially spaced breakout areas at the outer periphery of said central stub portion comprising adhered together areas of said layers.

9. A laminated abrasive cutting wheel comprising a plurality of circular layers of abrasive material each including a rim portion and a central stub portion integral with said rim portion, said rim portions being adhered together and the central stub portions being free of adherance, whereby upon complete wearing down of said rim portions said central stub portions are separable to constitute individual cutting wheels.

10. A laminated abrasive cutting wheel comprising a plurality of circular layers of abrasive material each including a circular rim portion and a central stub portion integral with said rim portion, adhesive means adhering said rim portions together and non-adhesive means between said central stub portions, whereby upon complete wearing down of said rim portions said central stub portions are separable to constitute individual cutting wheels.

References Cited in the file of this patent

UNITED STATES PATENTS

| Number | Name | Date |
|---|---|---|
| 1,303,541 | Curtis | May 13, 1919 |
| 1,947,662 | Robinson | Feb. 20, 1934 |
| 2,047,649 | Robinson | July 14, 1936 |
| 2,457,516 | Allison | Dec. 28, 1948 |
| 2,616,229 | Allison | Nov. 4, 1952 |